(12) United States Patent
Tetsuka et al.

(10) Patent No.: US 8,162,191 B2
(45) Date of Patent: Apr. 24, 2012

(54) BICYCLE BATTERY HOLDER

(75) Inventors: Toshio Tetsuka, Osaka (JP); Fumiaki Yoshida, Osaka (JP)

(73) Assignee: Shimano Inc., Osaka (JP)

( * ) Notice: Subject to any disclaimer, the term of this patent is extended or adjusted under 35 U.S.C. 154(b) by 1038 days.

(21) Appl. No.: 12/106,587

(22) Filed: Apr. 21, 2008

(65) Prior Publication Data
US 2009/0261134 A1 Oct. 22, 2009

(51) Int. Cl.
*B62J 11/00* (2006.01)
(52) U.S. Cl. .................. 224/459; 224/441; 224/902
(58) Field of Classification Search .................. 224/441, 224/451, 454, 458, 459, 462, 902, 255, 272, 224/545, 567; 429/96
See application file for complete search history.

(56) References Cited

U.S. PATENT DOCUMENTS

| | | | | |
|---|---|---|---|---|
| 675,390 | A | * | 6/1901 | Keating ........................... 429/99 |
| 1,439,430 | A | * | 12/1922 | Lyhne .............................. 429/97 |
| 4,339,060 | A | * | 7/1982 | Braida, Jr. ..................... 224/428 |
| 5,217,824 | A | * | 6/1993 | Womack ......................... 429/96 |
| 5,378,553 | A | * | 1/1995 | Shoji .............................. 429/97 |
| 6,095,270 | A | * | 8/2000 | Ishikawa ...................... 180/68.5 |
| 6,230,834 | B1 | * | 5/2001 | Van Hout et al. ............ 180/68.5 |
| 6,423,443 | B1 | * | 7/2002 | Tsuboi et al. ................... 429/98 |
| 6,669,220 | B2 | | 12/2003 | Meggiolan |
| 6,896,277 | B2 | | 5/2005 | Meggiolan |
| 7,100,932 | B2 | | 9/2006 | Meggiolan |
| 7,267,352 | B2 | | 9/2007 | Ishikawa |
| 7,654,550 | B2 | * | 2/2010 | Chuang ....................... 280/288.4 |
| 7,726,427 | B2 | * | 6/2010 | Picavet ......................... 180/68.5 |
| 2005/0156001 | A1 | | 7/2005 | Dal Pra et al. |
| 2007/0003828 | A1 | | 1/2007 | Meggiolan |

FOREIGN PATENT DOCUMENTS

| | | |
|---|---|---|
| EP | 1 911 666 A1 | 4/2008 |
| JP | 10-40890 A | 2/1998 |
| TW | M312485 | 5/2007 |

OTHER PUBLICATIONS

Taiwan Office Action of corresponding Tiwan Application No. 097129538 dated Mar. 11, 2011.

* cited by examiner

*Primary Examiner* — Justin Larson
(74) *Attorney, Agent, or Firm* — Global IP Counselors, LLP (57) ABSTRACT

A bicycle battery holder for retaining a battery is basically provided with a bracket member, an engaging member and a lever member. The engaging member is movably mounted to the bracket member and configured to selectively retain the battery to the bracket. The lever member is movably mounted to the bracket member and operatively coupled to the engaging member to move the engaging member in a first direction with respect to the bracket member when the lever member is moved from a first lever position to a second lever position.

19 Claims, 11 Drawing Sheets

BICYCLE BATTERY HOLDER

BACKGROUND OF THE INVENTION

1. Field of the Invention

This invention generally relates to a bicycle battery holder. More specifically, the present invention relates to bicycle battery holder in which the battery can be easily installed and removed.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Recently, bicycles have been equipped with electrical components to make riding easier and more enjoyable for the rider. Some bicycles are equipped with electrically controlled shifting systems. Such systems require electricity from a power source, such as a wheel hub generator and/or a battery. In cases where a battery is used as a power source, a mounting structure must be provided to attach the battery to the bicycle frame. Preferably, the mounting structure is configured such that the battery can be easily installed and removed. One example of a battery holder is disclosed in U.S. Pat. No. 7,267,352 in which a stopper assembly is used to retain a battery unit on the mounting unit, which is attached to a seat tube of the bicycle frame. Another example of a battery holder is disclosed in U.S. Pat. No. 6,669,220 in which an integrated control and power unit has a battery holder which is attached to a down tube of the bicycle frame. While the battery holders of both of these patents work well, they have certain drawbacks. For example, in U.S. Pat. No. 7,267,352, the stopper assembly can be difficult for some riders to operate with one hand. The battery holder of U.S. Pat. No. 6,669,220 is merely held in place by a press fit such that the battery may accidentally fall out while riding over rough terrain.

In view of the above, it will be apparent to those skilled in the art from this disclosure that there exists a need for an improved battery holder. This invention addresses this need in the art as well as other needs, which will become apparent to those skilled in the art from this disclosure.

SUMMARY OF THE INVENTION

One object of the present invention is to provide a bicycle battery holder in which the battery can be easily installed and removed.

The foregoing objects can basically be attained by providing a bicycle battery holder for retaining a battery in which the bicycle battery holder basically comprises a battery, a bracket member, an engaging member and a lever member. The engaging member is movably mounted to the bracket member and configured to selectively retain the battery to the bracket member. The lever member is movably mounted to the bracket member and operatively coupled to the engaging member to move the engaging member in a first direction with respect to the bracket member when the lever member is moved from a first lever position to a second lever position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
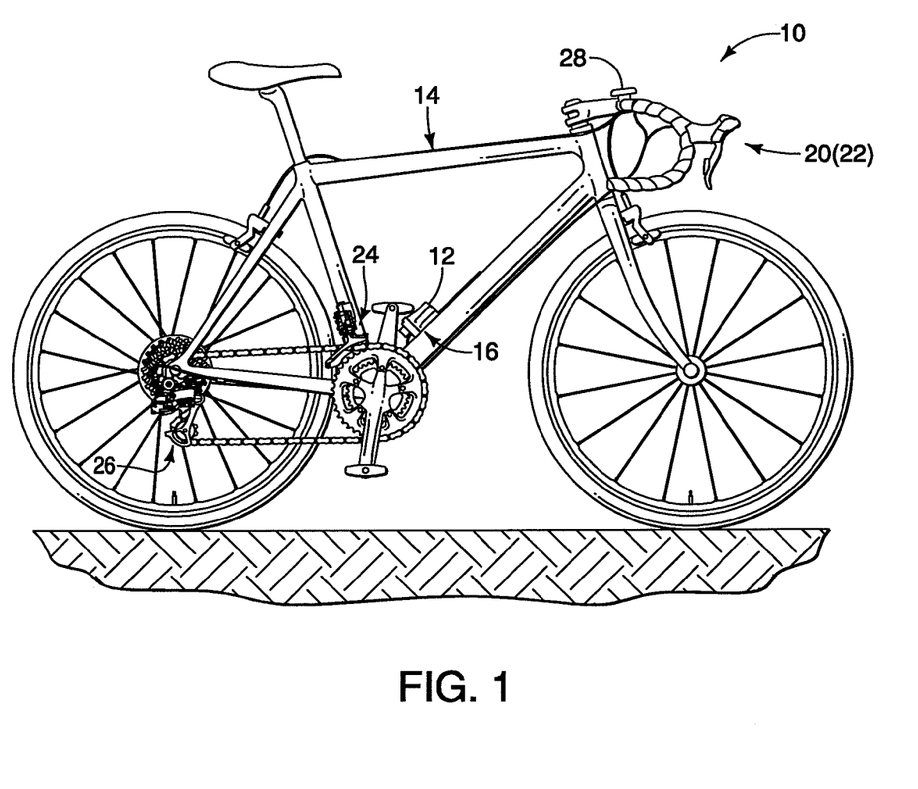
FIG. 1 is a side elevational view of a bicycle having an electrically controlled shifting system in which a battery is mounted to a bicycle frame using a bicycle battery holder in accordance with one preferred embodiment.
Figure 2:
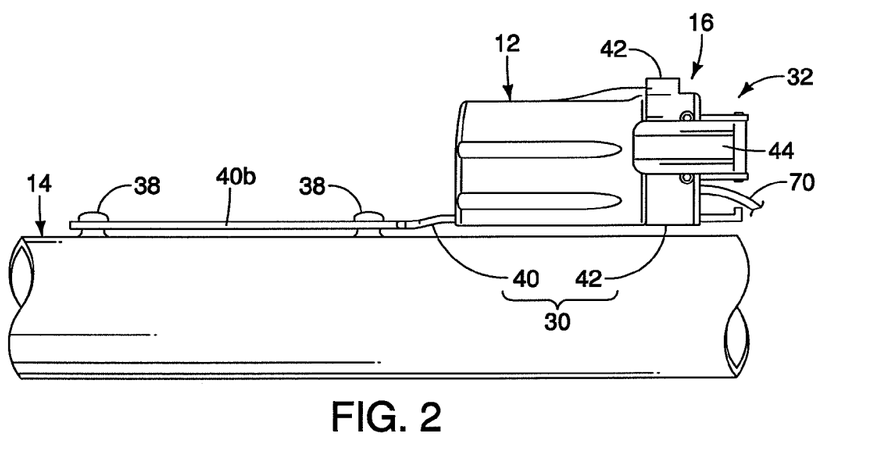
FIG. 2 is a partial side elevational view of the bicycle battery holder illustrated in FIG. 1 with the bracket member mounted to the down tube of the bicycle frame and the battery holder assembly at the second battery retaining location (fully seated position)
Figure 3:
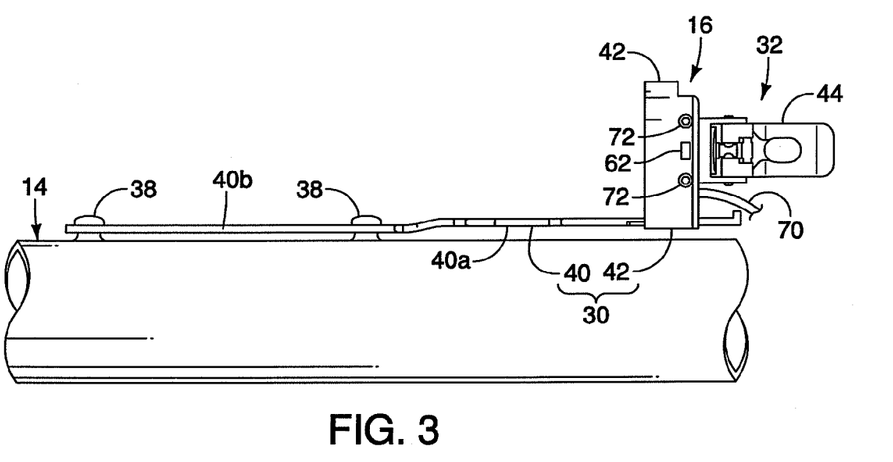
FIG. 3 is a partial side elevational view, similar to FIG. 2, of the bicycle battery holder illustrated in FIG. 1 with the bracket member mounted to the down tube of the bicycle frame and the battery holder removed.

Referring initially to FIGS. 1 to 3, a bicycle 10 is illustrated that is equipped with an electrically controlled shifting system in which a battery 12 is mounted to a bicycle frame 14 using a bicycle battery holder 16 in accordance with one preferred embodiment. As best seen in FIGS. 2 and 3, the bicycle battery holder 16 is fixedly coupled to the bicycle frame 14 of the bicycle 10 with the battery 12 being easily removed from and reattached to the bicycle battery holder 16 as explained below.

Basically, as seen in FIG. 1, the electrically controlled shifting system includes a pair of electric shifters 20 and 22, a front motorized derailleur 24, a rear motorized derailleur 26 and a cycle computer 28. The electric shifters 20 and 22 can be configured to electronically control positioning of a chain relative to front and rear chain sprockets of the bicycle 10 in a conventional manner. Specifically, control signals from the electric shifters 20 and 22 are transmitted to electric motor units (not shown) in each of the motorized derailleurs 24 and 26 such that a chain guide moves the chain in a conventional manner to the selected chain sprocket. Since the electric motor units of the motorized derailleurs 24 and 26 are electrically powered, a power source is necessary to operate them. Thus, the battery 12 supplies electrical power to at least motor units (not shown) of the motorized derailleurs 24 and 26. In particular, the bicycle battery holder 16 is electrically coupled to the motor units (not shown) of the motorized derailleurs 24 and 26 and the battery 12 is electrically coupled to the bicycle battery holder 16 as explained below. Since electric shifters, motorized derailleurs and cycle computers are well know in the bicycle art, the electric shifters 20 and 22, the motorized derailleurs 24 and 26 and the cycle computer 28 will not be discussed or illustrated in detail herein.

Referring now to FIGS. 4 to 10 and 13, the bicycle battery holder 16 basically includes a stationary mounting structure 30, a battery retaining mechanism 32, a battery release mechanism 34 (FIG. 13) and an electrical contact structure 36. The stationary mounting structure 30 basically supports the battery 12 on the bicycle frame 14. The battery retaining mechanism 32 basically secures the battery 12 to the stationary mounting structure 30 such that the battery 12 can be easily removed from and reattached to the stationary mounting structure 30 as explained below. The battery release mechanism 34 basically cooperates with the battery retaining mechanism 32 to release the battery 12 from the stationary mounting structure 30 by moving the battery retaining mechanism 32 out of engagement with the battery 12. The electrical contact structure 36 provides stationary contacts for the battery 12 such that the battery 12 can be easily and simultaneously disconnected from the motor units (not shown) of the motorized derailleurs 24 and 26.

As best seen in FIGS. 2 and 3, the stationary mounting structure 30 of the bicycle battery holder 16 is fixedly coupled to the down tube of the bicycle frame 14 by a pair of mounting bolts 38 at the anchoring points that are typically used for attaching a bottle cage to the down tube of the bicycle frame 14. The stationary mounting structure 30 basically includes a mounting rail 40 and a bracket member 42.

Figure 6:
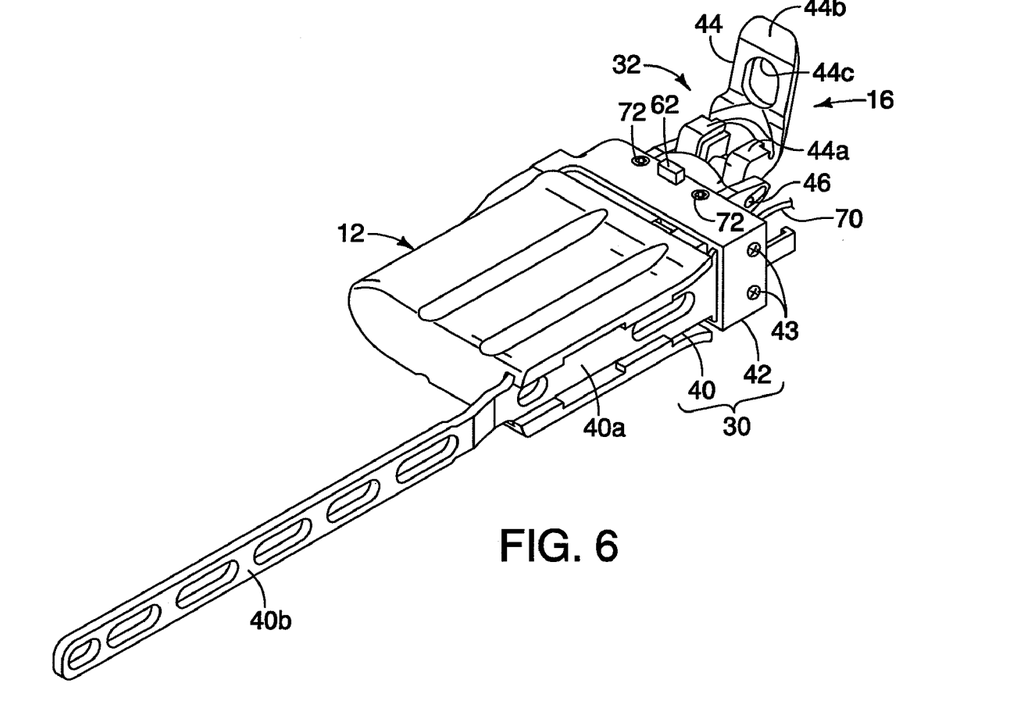
FIG. 6 is a bottom side perspective view of the bicycle battery holder illustrated in FIGS. 1 to 5 showing the battery on the bracket member of the battery holder assembly at the first battery retaining location (non-fully seated position)
Figure 7:
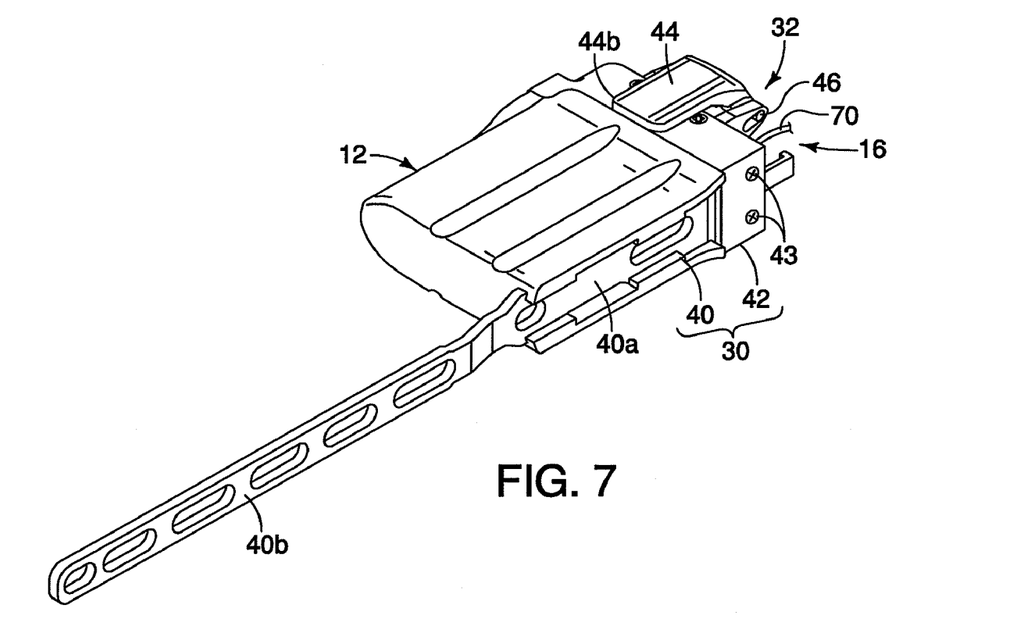
FIG. 7 is a bottom side perspective view of the bicycle battery holder illustrated in FIGS. 1 to 6 showing the battery on the bracket member of the battery holder assembly at the second battery retaining location (fully seated position)
Figure 8:
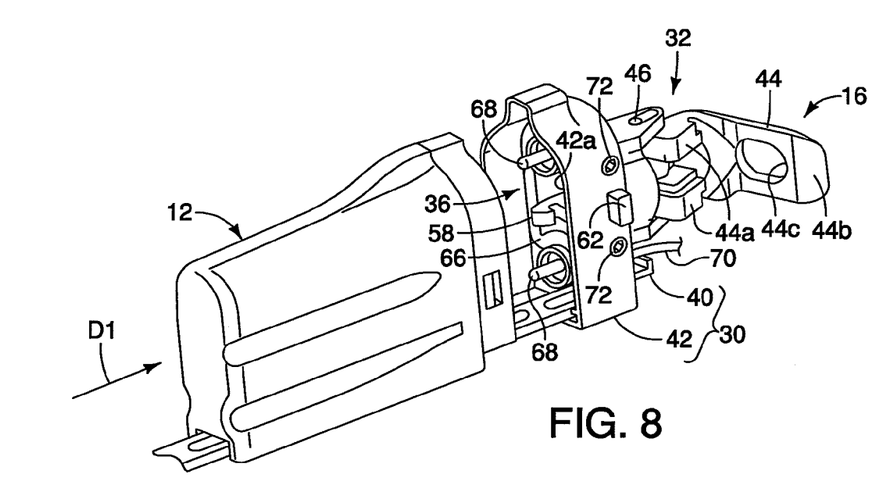
FIG. 8 is a side perspective view of the bicycle battery holder with the battery positioned for installation into the battery holder assembly illustrated in FIGS. 1 to 7.

The mounting rail 40 is a hard rigid member constructed of a lightweight material such as aluminum or any other suitable material. The mounting rail 40 is a one-piece, unitary member that can basically be divided into a bracket connecting section 40a and a frame attachment section 40b. The bracket connecting section 40a is shaped to be fixedly coupled with the battery 12 by sliding movement of the battery 12 in a first direction D1 with respect to the bracket member 42. Preferably, the bracket connecting section 40a has two wide sections that mates with a corresponding structure of the battery 12 as discussed below. The bracket connecting section 40a is preferably fixedly attached to the bracket member 42 by a pair of fasteners such as screws 43 as seen in FIGS. 6 and 7. The frame attachment section 40b has a plurality of mounting holes for receiving the mounting bolts 38.

The bracket member 42 is configured to be fixedly coupled to the bicycle frame 14 by the mounting rail 40 as mentioned above. The bracket member 42 has a recess 42a that mates with one end of the battery 12 when the battery 12 is slid along the mounting rail 40. The bracket member 42 is a hard rigid member constructed of a lightweight material such as hard plastic or any other suitable material.

Figure 13:
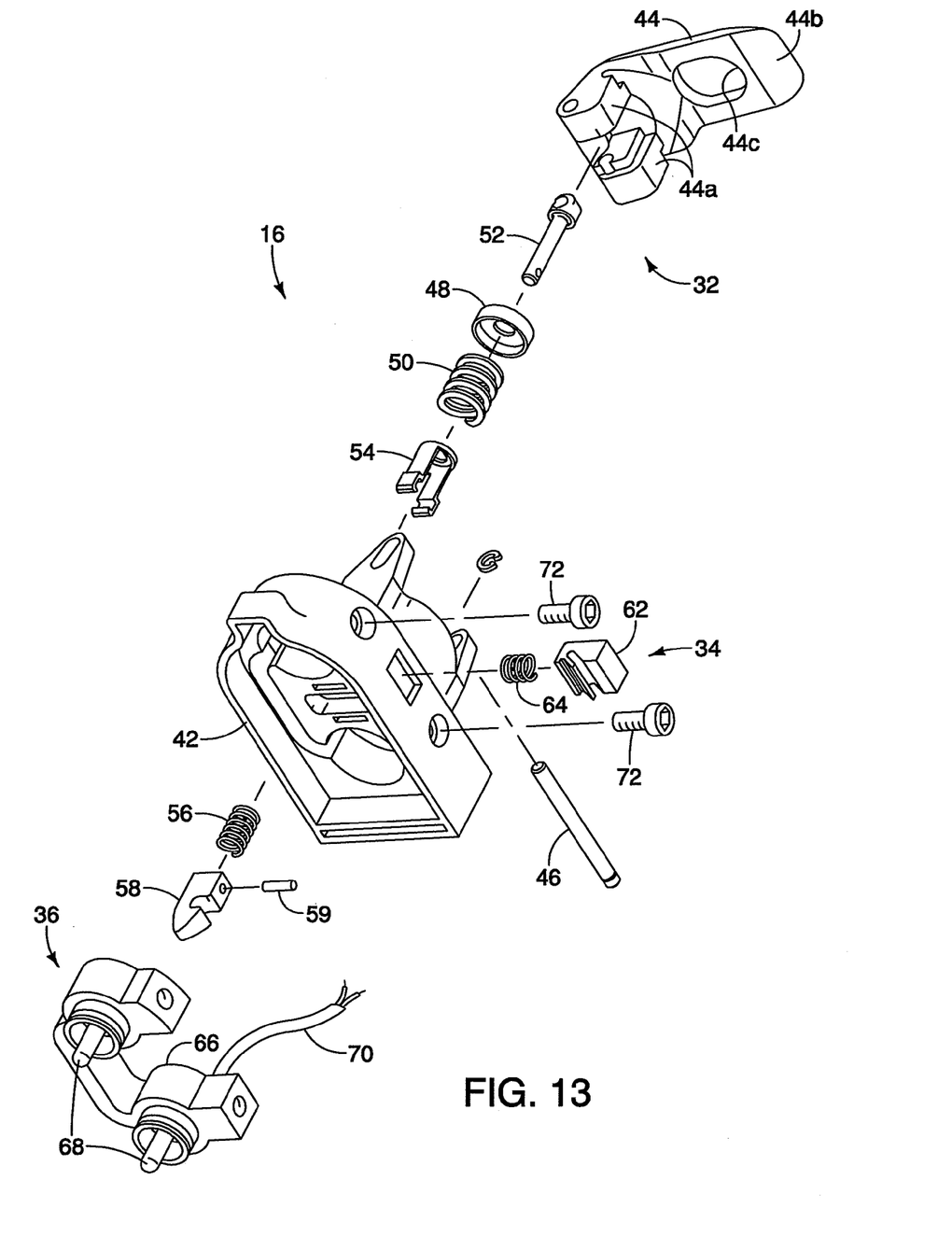
FIG. 13 is an exploded perspective view of the bicycle battery holder illustrated in FIGS. 1 to 10.
Figure 14:
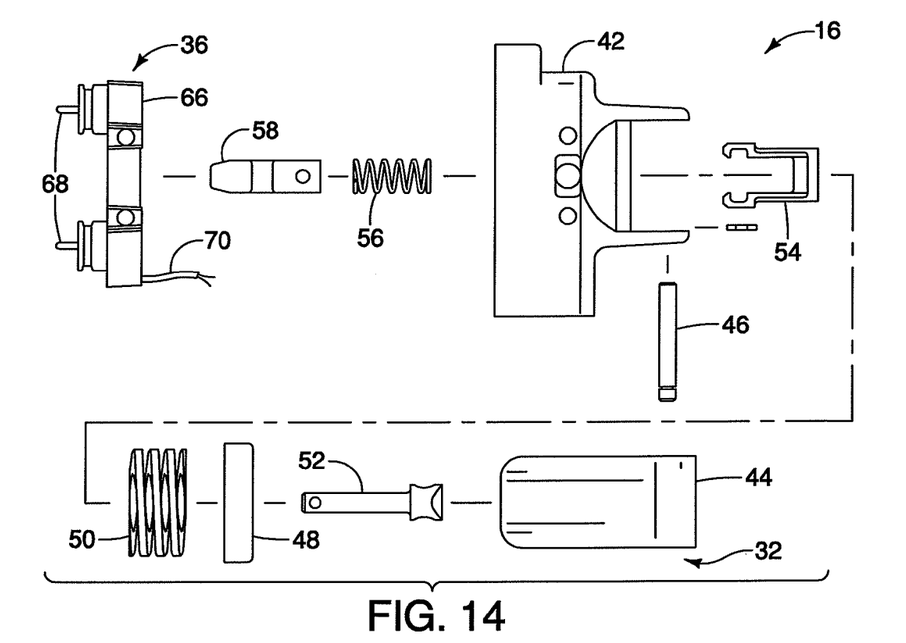
FIG. 14 is an exploded side elevational view of the bicycle battery holder illustrated in FIGS. 1 to 10.
Figure 15:
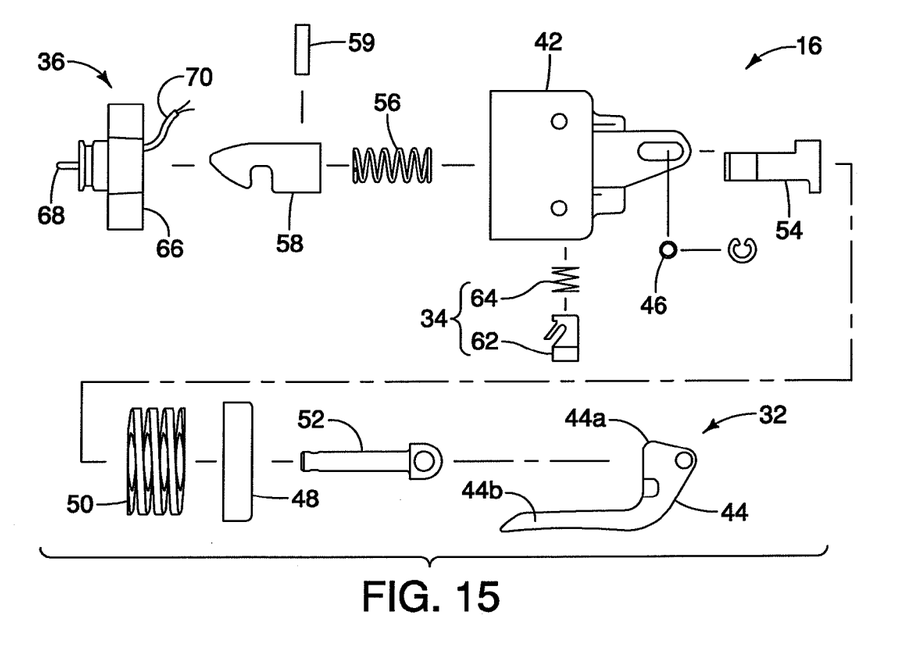
FIG. 15 is an exploded top plan view of the bicycle battery holder illustrated in FIGS. 1 to 10.

As best seen in FIGS. 13 to 15, the battery retaining mechanism 32 basically includes a cam lever member 44, a cam axle 46, a main spring holder 48, a main spring 50, a connecting pin 52, a spring cap 54, a hook spring 56, and a hook 58. The battery retaining mechanism 32 is supported by the bracket member 42. The battery retaining mechanism 32 is configured and arranged with respect to the bracket member 42 for selectively securing the battery 12 to the bracket member 42. In the illustrated embodiment, the battery retaining mechanism 32 and the battery release mechanism 34 cooperate together to provide for quick replacement of the battery 12. Moreover, in the illustrated embodiment, the battery retaining mechanism 32 provides for a tight coupling between the battery 12 and the bracket member 42 as discussed below.

As seen in FIGS. 16 to 20, the connecting pin 52 and the hook 58 are fixed together by a pin 59 to form an engaging member 60 that retains the battery 12 to the bracket member 42. The connecting pin 52 and the hook 58 are both hard rigid members that are preferably formed of a lightweight metal material such as aluminum. Basically, the engaging member 60 is coupled to the cam lever member 44 by the cam axle 46 for movement in the first direction D1. In particular, the connecting pin 52 has a hole for pivotally receiving the cam axle 46, which in turn is supported in a pair of slots of the bracket member 42.

Figure 9:
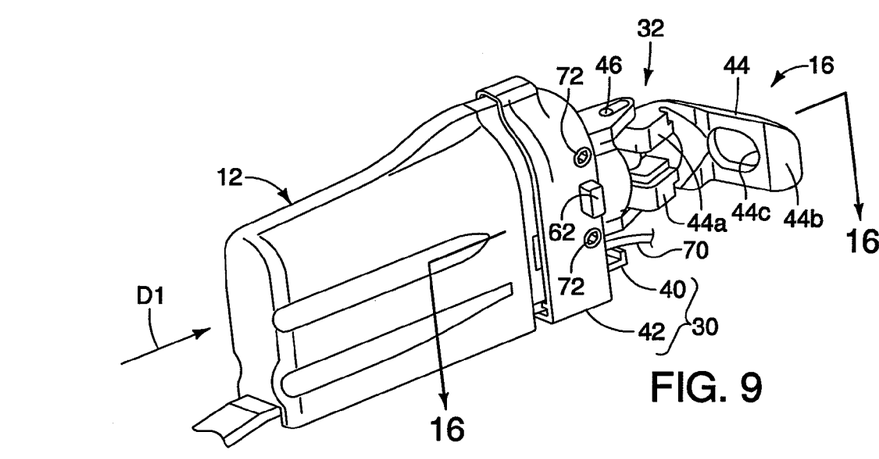
FIG. 9 is a side perspective view, similar to FIG. 8, of the bicycle battery holder with the battery at a first battery retaining location with respect to the bicycle battery holder such that the battery is retained to the battery holder assembly, but not in a fully seated position.
Figure 10:
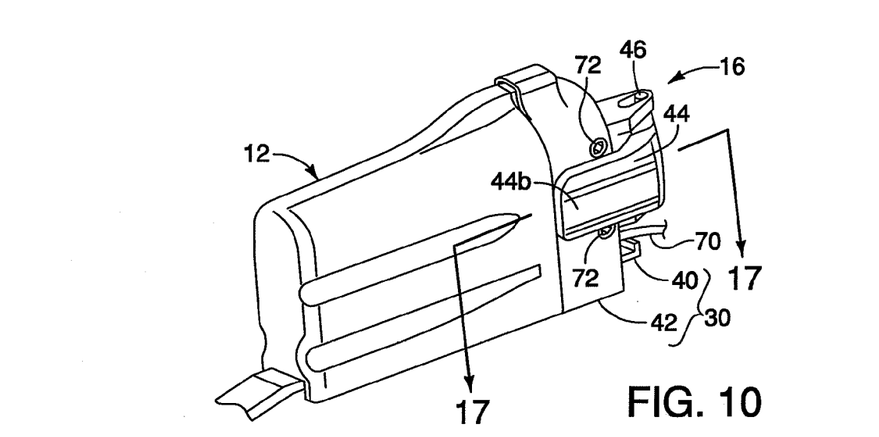
FIG. 10 is a side perspective view, similar to FIGS. 8 and 9, of the bicycle battery holder with the battery at a second battery retaining location with respect to the bicycle battery holder such that the battery is retained to the battery holder assembly in a fully seated position.
Figure 16:
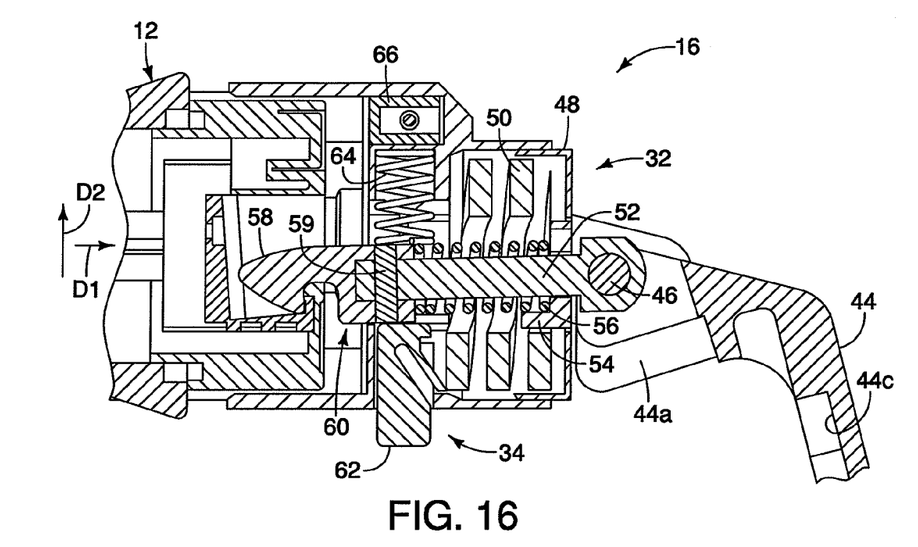
FIG. 16 is a cross-sectional view of the bicycle battery holder taken along the line 16-16 in FIG. 9, showing the battery holder assembly at the first battery retaining location (non-fully seated position)

When the cam lever member 44 is in a first lever (open) position, as seen in FIG. 16, the engaging member 60 is configured and arranged to initially engage and retain the battery 12 by merely sliding the battery 12 in the first direction D1 with respect to the bracket member 42. After this initial engagement between the battery 12 and the engaging member 60 occurs with the cam lever member 44 in the first lever (open) position, the battery 12 and the engaging member 60 are disposed at a first battery retaining location with respect to the bracket member 24 as seen in FIGS. 6, 9 and 16.

In the first battery retaining location, the battery 12 is retained on the bracket member 24 by the engaging member 60. By rotating the cam lever member 44 from the first lever (open) position (FIG. 16) to a second lever (closed) position (FIG. 17), the engaging member 60 is moved further in the first direction D1 past the first battery retaining location such that a tight coupling between the battery 12 and the bracket member 42 can then be obtained. Thus, the engaging member 60 is movably mounted to the bracket member 42 to selectively retain the battery 12 to the bracket member 42 as discussed below.

Referring back to FIGS. 4 to 10, the cam lever member 44 is pivotally coupled to the bracket member 42 by the cam axle 46 such that the cam lever member 44 is movable from the first lever (open) position (see FIGS. 4 to 6, 8 and 9) to the second lever (closed) position (see FIGS. 7 and 10) for moving the engaging member 60 in the first direction D1 as mentioned above. The first lever position is basically a free or unlocked position in which the battery release mechanism 34 can be operated to release the battery 12, while the second lever position is basically a locked position in which the battery release mechanism 34 is inaccessible.

The battery 12 can be retained on the bracket member 42 when the cam lever member 44 is in either the first lever position or the second lever position. In the first lever position, the cam lever member 44 holds the engaging member 60 at the first battery retaining location with respect to the bracket member 42 such that the battery 12 can be initially installed on the bracket member 42 by moving the battery 12 on the mounting rail 40 in the first direction D1. When the battery 12 engages the hook 58 of the engaging member 60, the battery 12 is held at the first battery retaining location on the bracket member 42. When the cam lever member 44 is moved to the second lever (closed) position, the engaging member 60 is moved further in the first direction D1 past the first battery retaining location such that a tight coupling between the battery 12 and the bracket member 42 is obtained. Thus, the battery retaining mechanism 32 is configured and arranged such that even if the cam lever member 44 is moved to the first lever (open) position unintentionally, the hook 58 prevents the battery 12 from coming off of the bracket member 42.

The cam lever member 44 includes a cam portion 44a and a lever portion 44b with a release button receiving recess 44c in the lever portion 44b. The cam portion 44a is operatively engages the bracket member 24 via the main spring holder 48 and the main spring 50 to move the engaging member 60 in the first direction D1 when the cam lever member 44 is moved from the first lever position to the second lever position. In particular, the cam lever member 44 is moved from the first lever position to the second lever position, the cam portion 44a contacts the main spring holder 48 and compresses the main spring 50 as the cam lever member 44 pulls the engaging member 60 in the first direction D1 with respect to the bracket member 42. Thus, the cam portion 44a cooperates with the main spring holder 48 and the main spring 50 to pull the engaging member 60 in the first direction D1 with respect to the bracket member 42. The cam portion 44a is also configured and arranged to be held in the second lever position by the urging force of the main spring 50. In particular, the cam portion 44a is configured and arranged to have an over-the-center type of arrangement with respect to the cam axle 46 such that the urging force of the main spring 50 is located on one side of the cam axle 46 to push the cam lever member 44 towards the first lever (open) position prior to the cam lever member 44 reaching the second lever position and such that the urging force of the main spring 50 is located on the other side of the cam axle 46 to push the cam lever member 44 towards the second lever (closed) position.

The main spring holder 48 is a rigid cap shaped member with a hole through the end surface so that the connecting pin 52 can pass therethrough. The main spring holder 48 covers one end of the main spring 50 and acts as a contact surface for the cam portion 44a of the cam lever member 44. The main spring 50 is a compression spring which disposed between the main spring holder 48 and an end surface of the bracket member 42. The main spring holder 48 and the main spring 50 cooperate together to operatively transmit an urging force between the bracket member 42 and the cam lever member 44.

Figure 17:
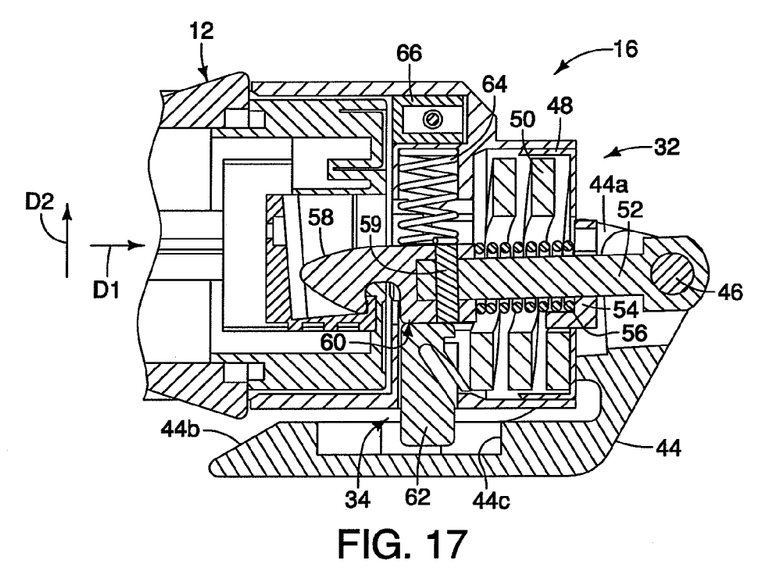
FIG. 17 is a cross-sectional view of the bicycle battery holder taken along the line 17-17 in FIG. 10, showing the battery holder assembly at the second battery retaining location (fully seated position)
Figure 20:
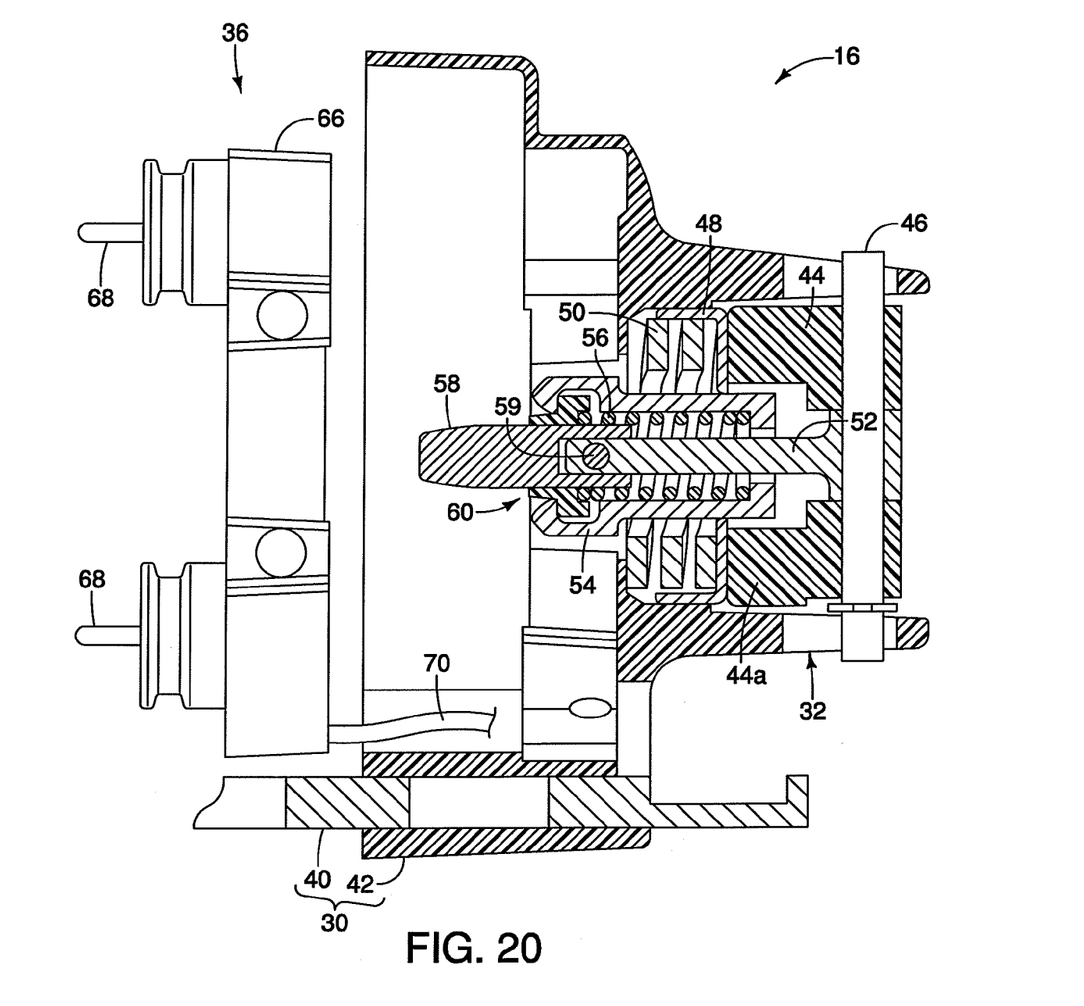
FIG. 20 is a cross-sectional view of the bicycle battery holder taken along the line 20-20 in FIG. 12, but with the terminal block exploded outwardly from the bracket member.

The spring cap 54 and the hook spring 56 cooperate together to operatively transmit an urging force between the bracket member 42 and the cam lever member 44 via the engaging member 60. The spring cap 54 and the hook spring 56 are concentrically mounted on the connecting pin 52 with the hook spring 56 operatively disposed between the spring cap 54 and the hook 58. As seen in FIG. 20, the spring cap 54 has one end fixed to the bracket member 42 and the other end supporting the hook spring 56. As seen in FIG. 17, when the cam lever member 44 is rotated to the second lever (closed) position, the hook spring 56 is compressed by the movement of the engaging member 60 in the first direction D1.

Referring now to FIGS. 13, 16 and 17, the battery release mechanism 34 will now be described. Basically, the battery release mechanism 34 includes a release button 62 and a return spring 64. The release button 62 is movably mounted to the bracket member 42 against an urging force of the return spring 64. In particular, the return spring 64 is disposed between the bracket member 42 and the hook 58 to bias the engaging member 60 against an inner end of the release button 62. In other words, the return spring 64 holds the engaging member 60 and the release button 62 in rest positions such that the engaging member 60 is located along the center plane of the bracket member 42 and the release button 62 protrudes out of the bracket member 42.

Figure 18:
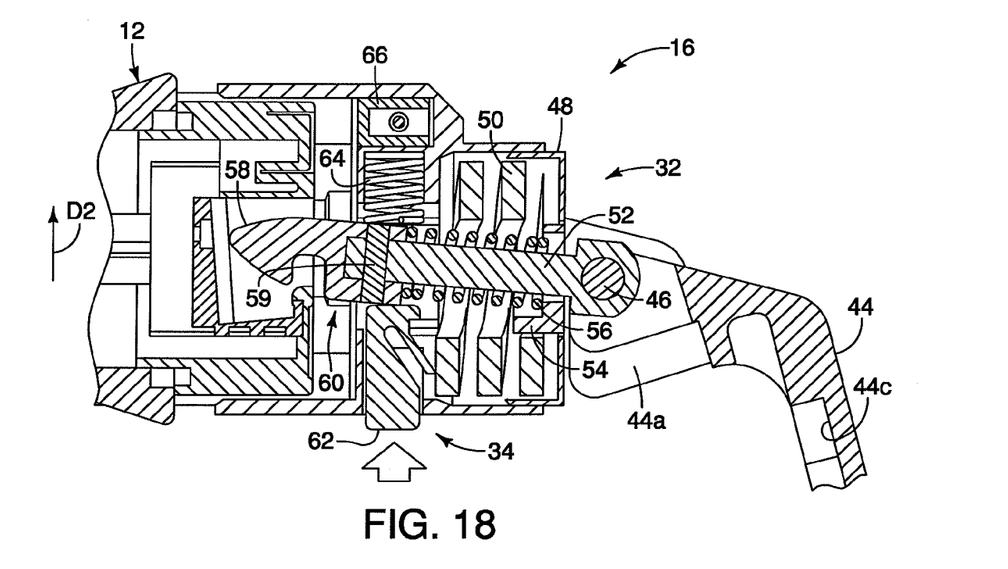
FIG. 18 is a cross-sectional view, similar to FIG. 16, of the bicycle battery holder, but with the release button press to release the battery.
Figure 19:
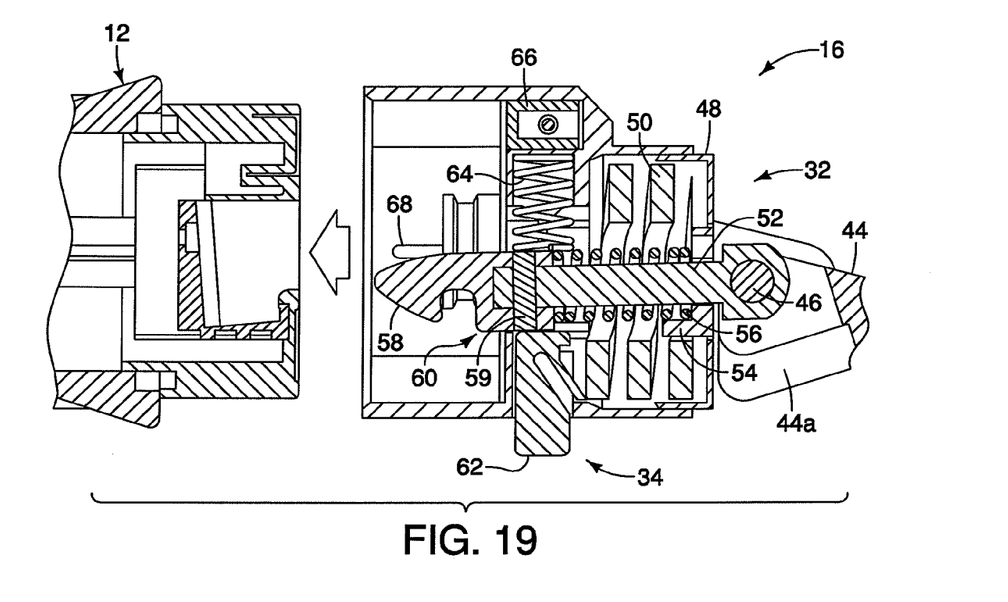
FIG. 19 is a cross-sectional view, similar to FIGS. 16 and 18, of the bicycle battery holder, but with the battery detached from the bicycle battery holder.

As seen in FIGS. 16 and 18, the release button 62 is operatively coupled to the engaging member 60 to move the engaging member 60 to a battery release position (FIG. 18) when the release button 62 is moved from a first button (rest) position (FIG. 16) to a second button (depressed) position (FIG. 18). Thus, when the release button 62 is depressed against the urging force of the return spring 64, the hook 58 is moved laterally to the battery release position. In other words, when the engaging member 60 is engaged with the battery 12 while in the first battery retaining location (i.e., the cam lever is in the first lever (open) position), the lateral movement of the release button 62 in a transverse direction D2 also moves the engaging member 60 in the transverse direction D2. This lateral movement of the release button 62 and the engaging member 60 in the transverse direction D2 causes the engaging member 60 to move out of engagement from the battery 12 when the engaging member and the battery are in the first battery retaining location.

Moreover, when the battery 12 is inserted in to the recess 42a of the bracket member 42, the battery 12 initially contacts the hook 58 to move the hook 58 laterally to the battery release position against the urging force of the return spring 64 and then the hook 58 moves laterally back to the rest position for retaining the battery 12 to the bracket member 42 in the first battery retaining location as seen in FIG. 16. Now, the cam lever member 44 can be rotated to the second lever (closed) position (see FIGS. 7, 10 and 17) so that the engaging member 60 is moved in the first direction D1 to pull the battery 12 to the second battery retaining location as seen in FIG. 17. When the cam lever member 44 is in the second lever (closed) position (see FIGS. 7, 10 and 17), the lever portion 44b covers the release button 62 such that the release button 62 is disposed in the release button receiving recess 44c in the lever portion 44b. Thus, while the cam lever member 44 is in the second lever (closed) position, the release button 62 is inaccessible.

Figure 12:
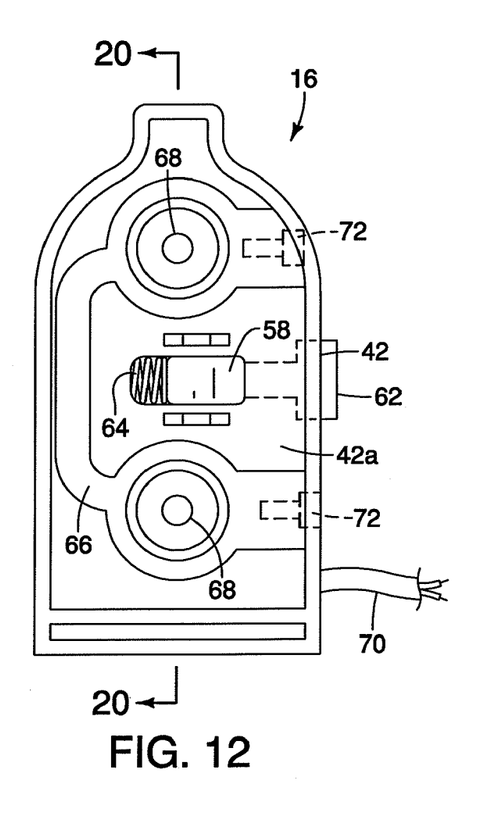
FIG. 12 is an end elevational view of the bicycle battery holder illustrated in FIGS. 1 to 10.

The electrical contact structure 36 basically includes a terminal block 66 with a pair of electrical (terminals) contacts 68 and an electrical wire 70. The electrical contacts 68 are embedded in the terminal block 66. As shown in FIGS. 12 and 13, the electrical contacts 68 extend from the terminal block 66 in a direction generally parallel to one another. The electrical contacts 68 are also generally parallel to the mounting rail 40 as seen in FIG. 20. The electrical contacts 68 are configured to extend into corresponding terminal receiving portions of the battery 12, as described below. The electrical contacts 68 are each electrically connected to one electrical conductor of the electrical wire 70 to transfer electrical power from the battery to the derailleurs 24 and 26. The terminal block 66 is formed of a substantially rigid plastic material with tubular portions (annular ring-like shape) concentrically arranged around the electrical contacts 68. These tubular portions of the terminal block 66 are thin walled portions with a sufficient amount of resiliency to act as sealing members. The terminal block 66 is secured to the bracket member 42 by a pair of bolts 72.

Figure 4:
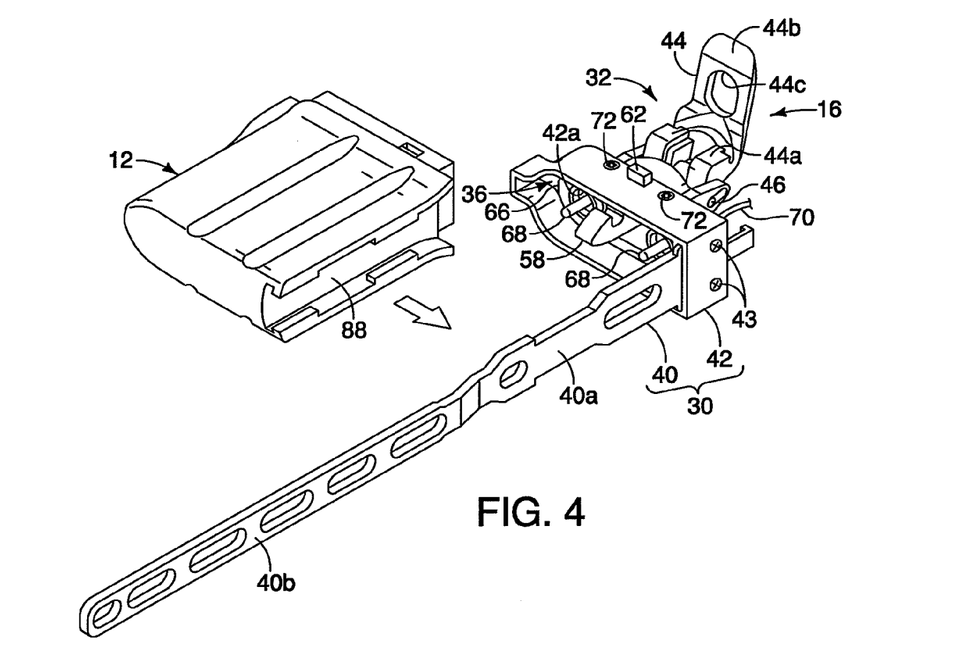
FIG. 4 is a bottom side perspective view of the bicycle battery holder illustrated in FIGS. 1 to 3 showing installation of the battery onto the battery holder assembly.
Figure 5:
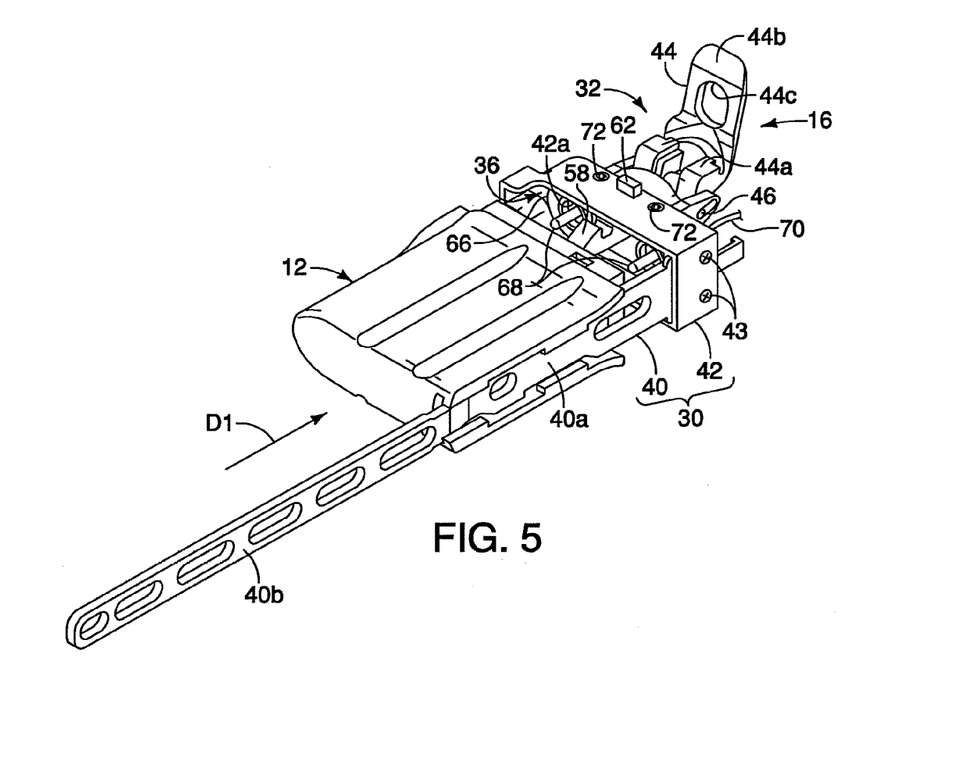
FIG. 5 is a bottom side perspective view of the bicycle battery holder illustrated in FIGS. 1 to 4 showing the battery on the bracket member of the battery holder assembly, but not yet moved to the first battery retaining location.
Figure 11:
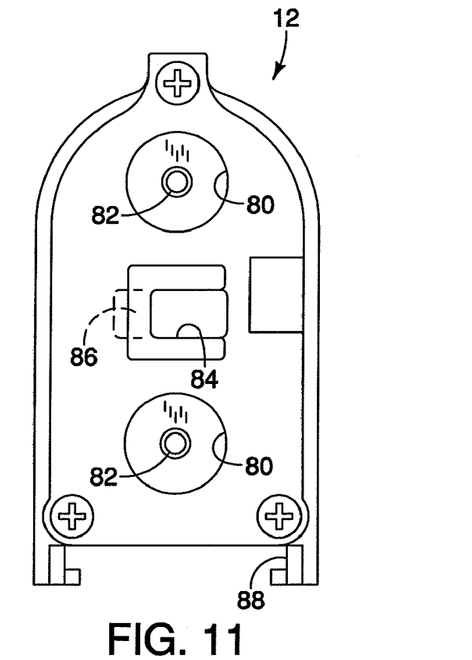
FIG. 11 is an end elevational view of the battery for the bicycle battery holder illustrated in FIGS. 1 to 10.

The battery 12 is a replaceable battery pack. Alternatively, the battery 12 can be a rechargeable battery that is rechargeable by the electricity generating device mounted to the bicycle 10. As seen in FIG. 11, the battery 12 has an end face that includes a pair of apertures 80 with each of the apertures 80 having a contact receiving bore 82. The apertures 80 and the contact receiving bores 82 are configured to receive the tubular portions of the terminal block 66 and the electrical contacts 68, respectively. The end face of the battery 12 also has a hook receiving recess 84 with a latch surface 86. As best seen in FIG. 4, the bottom surface of the battery 12 has a slot 88 formed by a pair of flanges with cutouts for receiving the bracket connecting section 40a of the mounting rail 40. Since batteries are conventional electronic components, further description of the battery 12 is omitted for the sake of brevity.

The hook receiving recess 84 with the latch surface 86 of the battery 12 constitutes a latch portion of the battery 12. The hook 58 initially contacts the opening edge of the hook receiving recess 84 when the battery 12 is being moved along the mounting rail 40 to the first battery retaining location such that the hook 58 moves laterally to the battery release position against the urging force of the return spring 64. Thus, the engaging member 60 is moved in the transverse direction D2 against the force of the return spring 64 during initial insertion of the battery 12 into the bracket member 42. Once the battery 12 reaches the first battery retaining location, the engaging member 60 is urged back to its rest position by the force of the return spring 64 such that the hook 58 engaged the latch surface 86 within the hook receiving recess 84 of the battery 12. In other words, the hook 58 of the engaging member 60 engage the latch surface 86 of the latch portion of the battery 12 prior to the cam lever member 44 being moved to the second lever position. Moreover, with this arrangement of the illustrated embodiment, the engaging member 60 is arranged with respect to the bracket member 42 to be automatically moved in the transverse direction D2 with respect to the first direction D1 in response to movement of the battery 12 in the first direction D1 to the first battery retaining location. Also with the mating connection between the bracket connecting section 40a and the slot 88 of the battery 12, movement of the battery is limited to a small amount of back and forward movement in the longitudinal direction. Now the battery 12 is retained on the bracket member 42 in the first battery retaining location. Rotation of the cam lever member 44 to the second lever (closed) position causes the engaging member 60 is moved further in the first direction D1 past the first battery retaining location such that a tight coupling between the battery 12 and the bracket member 42 is obtained.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle battery holder for retaining a battery comprising:
   a bracket member;
   an engaging member movably mounted to the bracket member and configured to selectively retain the battery to the bracket member;
   at least one electrical contact disposed on a battery facing surface of the bracket member with a contact portion of the at least one electrical contact being exposed relative to the battery facing surface of the bracket member to electrically contact the battery in a contact engagement direction; and
   a lever member movably mounted to the bracket member and operatively coupled to the engaging member to move the engaging member in the contact engagement direction with respect to the bracket member when the lever member is moved from a first lever position to a second lever position,
   the engaging member being movably coupled to the lever member such that the engaging member moves relative to the lever member as the lever member moves between the first and second lever positions,
   the contact portion of the at least one electrical contact meeting with the battery facing surface of the bracket member to define a plane perpendicular to the contact engagement direction,
   the engaging member being at least partially disposed on a first lateral side of the plane, and the engaging member and the lever member being coupled together on a second, opposite lateral side of the plane.

2. The bicycle battery holder according to claim 1, wherein the lever member includes a cam portion that operatively engages the bracket member to move the engaging member in the contact engagement direction when the lever member is moved from the first lever position to the second lever position.

3. The bicycle battery holder according to claim 1, wherein the engaging member includes a hook that is configured to engage a latch portion of the battery prior to the lever member being moved to the second lever position.

4. The bicycle battery holder according to claim 1, wherein the bracket member and the engaging member are configured to engage the battery by sliding movement of the battery in the contact engagement direction with respect to the bracket member.

5. The bicycle battery holder according to claim 1, wherein the engaging member is movably mounted to the bracket member to move in a transverse direction with respect to the contact engagement direction and to engage the battery when the battery is at a first battery retaining location with respect to the bracket member.

6. The bicycle battery holder according to claim 5, wherein the engaging member is arranged with respect to the bracket member to be moved in the transverse direction in response to movement of the battery in the contact engagement direction to the first battery retaining location.

7. A bicycle battery holder for retaining a battery comprising:
a bracket member;
an engaging member movably mounted to the bracket member and configured to selectively retain the battery to the bracket member;
a lever member movably mounted to the bracket member and operatively coupled to the engaging member to move the engaging member in a first direction with respect to the bracket member as the lever member is moved from a first lever position to a second lever position; and
a release button movably mounted to the bracket member and operatively coupled to the engaging member to move the engaging member to a battery release position when the release button is moved from a first button position to a second button position.

8. The bicycle battery holder according to claim 7, wherein the lever member is arranged with respect to the release button such that the release button is inaccessible with the lever member in the second lever position and accessible with the lever member in the first lever position.

9. The bicycle battery holder according to claim 1, further comprising
a release button movably mounted to the bracket member and operatively coupled to the engaging member to move the engaging member to a battery release position when the release button is moved from a first button position to a second button position.

10. A bicycle battery holder for retaining a battery comprising:
a bracket member;
an engaging member movably mounted to the bracket member and configured to selectively retain the battery to the bracket member;
a lever member movably mounted to the bracket member and operatively coupled to the engaging member to move the engaging member in a first direction with respect to the bracket member when the lever member is moved from a first lever position to a second lever position; and
a release button movably mounted to the bracket member and operatively coupled to the engaging member to move the engaging member to a battery release position when the release button is moved from a first button position to a second button position,
the lever member being arranged with respect to the release button such that the release button is inaccessible with the lever member in the second lever position and accessible with the lever member in the first lever position.

11. A bicycle battery holder for retaining a battery comprising:
a bracket member configured to be coupled to the battery by movement of the battery in a first direction with respect to the bracket member;
an engaging member movably mounted to the bracket member to move in a transverse direction with respect to the first direction and to engage and retain the battery at a first battery retaining location with respect to the bracket member; and
a lever member movably mounted to the bracket member and operatively coupled to the engaging member to move the engaging member in a first direction with respect to the bracket member as the lever member moves from a first lever position to a second lever position,
the engaging member being further movably mounted relative to the bracket member in the first direction to move the battery in the first direction past the first battery retaining location to a second battery retaining location,
the engaging member being further movably coupled to the lever member such that the engaging member moves relative to the lever member in response to the battery contacting the engaging member as the battery is installed in the first battery retaining location relative to the bracket member.

12. The bicycle battery holder according to claim 11, wherein
the engaging member includes a hook that is arranged with respect to the bracket member to engage a latch portion of the battery.

13. The bicycle battery holder according to claim 11, wherein
the engaging member is arranged with respect to the bracket member to be moved in the transverse direction in response to movement of the battery in the first direction to the first battery retaining location.

14. The bicycle battery holder according to claim 11, wherein
the bracket member and the engaging member are configured to engage the battery by sliding movement of the battery in the first direction with respect to the bracket member.

15. The bicycle battery holder according to claim 14, wherein
the lever member moves the engaging member in the first direction to move the battery from the first battery retaining location to the second battery retaining location when the lever member is moved from the first lever position to the second lever position.

16. The bicycle battery holder according to claim 15, wherein the lever member includes a cam portion that operatively engages the bracket member to move the engaging member in the first direction when the lever member is moved from the first lever position to the second lever position.

17. The bicycle battery holder according to claim 15, further comprising a release button movably mounted to the bracket member and operatively coupled to the engaging member to move the engaging member to a battery release position when the release button is moved from a first button position to a second button position.

18. The bicycle battery holder according to claim 17, wherein the lever member is arranged with respect to the release button such that the release button is inaccessible with the lever member in the second lever position and accessible with the lever member in the first lever position.

19. The bicycle battery holder according to claim 11, further comprising a release button movably mounted to the bracket member and operatively coupled to the engaging member to move the engaging member to a battery release position when the release button is moved from a first button position to a second button position.

\* \* \* \* \*